(12) United States Patent
Lin et al.

(10) Patent No.: US 10,244,471 B2
(45) Date of Patent: *Mar. 26, 2019

(54) METHOD FOR RECEIVING D2D DISCOVERY INFORMATION AND APPARATUS

(71) Applicant: HUAWEI TECHNOLOGIES CO., LTD., Shenzhen, Guangdong (CN)

(72) Inventors: Bo Lin, Beijing (CN); Tao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,208

(22) Filed: Jun. 4, 2018

(65) Prior Publication Data
US 2018/0288700 A1   Oct. 4, 2018

Related U.S. Application Data

(63) Continuation of application No. 15/346,124, filed on Nov. 8, 2016, now Pat. No. 10,021,640, which is a
(Continued)

(51) Int. Cl.
*H04W 52/02* (2009.01)
*H04W 76/27* (2018.01)

(52) U.S. Cl.
CPC ....... *H04W 52/0209* (2013.01); *H04W 52/02* (2013.01); *H04W 52/0225* (2013.01);
(Continued)

(58) Field of Classification Search
CPC . H04W 52/0209; H04W 76/77; H04W 52/02; H04W 52/0225; Y02D 70/24; Y02D 70/21; Y02D 70/00
See application file for complete search history.

(56) References Cited

U.S. PATENT DOCUMENTS 6,400,996 B1   6/2002  Hoffberg et al.
7,852,876 B2  12/2010  Farnsworth et al.
(Continued)

FOREIGN PATENT DOCUMENTS

CN  101772199  7/2010
CN  102547984  7/2012
(Continued)

OTHER PUBLICATIONS

Final Office Action, dated Jul. 27, 2018, in U.S. Appl. No. 15/840,688 (17 pp.).
(Continued)

*Primary Examiner* — Dominic E Rego
(74) *Attorney, Agent, or Firm* — Staas & Halsey LLP

(57) ABSTRACT

Embodiments of the present disclosure provide a method for receiving D2D discovery information and an apparatus. The method for receiving D2D discovery information includes: sending, by an upper layer of a radio resource control RRC layer of a D2D communication device, a first instruction to a physical layer of the D2D communication device, where the first instruction is used to instruct the physical layer to switch from a D2D sleep state to a D2D listening state; and receiving, by the physical layer of the D2D communication device, the first instruction and switching from the D2D sleep state to the D2D listening state according to the first instruction, to listen to D2D discovery information. This reduces power consumption of the D2D communication device and prolongs a standby time of the D2D communication device.

6 Claims, 5 Drawing Sheets

---

An upper layer of an RRC layer of a D2D communication device sends a first instruction to a physical layer of the D2D communication device, where the first instruction is used to instruct the physical layer to switch from a D2D sleep state to a D2D listening state — 101

The physical layer of the D2D communication device receives the first instruction and switches from the D2D sleep state to the D2D listening state according to the first instruction, to listen to D2D discovery information — 102

Related U.S. Application Data continuation of application No. PCT/CN2014/077182, filed on May 9, 2014.

(52) U.S. Cl.
CPC ............ *H04W 76/27* (2018.02); *Y02D 70/00* (2018.01); *Y02D 70/21* (2018.01); *Y02D 70/24* (2018.01)

(56) References Cited

U.S. PATENT DOCUMENTS

| | | | |
|---|---|---|---|
| 8,499,097 | B1 | 7/2013 | Muhanna et al. |
| 9,189,182 | B2 | 11/2015 | Jung et al. |
| 9,350,799 | B2 | 5/2016 | Wang |
| 9,877,273 | B2 | 1/2018 | Lin et al. |
| 2006/0126554 | A1 | 6/2006 | Motegi et al. |
| 2006/0153237 | A1 | 7/2006 | Hwang et al. |
| 2007/0130403 | A1 | 6/2007 | Bauer et al. |
| 2007/0202835 | A1* | 8/2007 | Son .................. H04W 52/0225 455/343.1 |
| 2010/0003982 | A1 | 1/2010 | Somasundaram et al. |
| 2011/0161697 | A1 | 6/2011 | Qi et al. |
| 2011/0191608 | A1 | 8/2011 | Vetteth |
| 2012/0163235 | A1 | 6/2012 | Ho et al. |
| 2012/0243431 | A1 | 9/2012 | Chen et al. |
| 2012/0243437 | A1 | 9/2012 | Horn et al. |
| 2013/0148161 | A1 | 6/2013 | Park et al. |
| 2013/0148162 | A1 | 6/2013 | Park et al. |
| 2013/0155954 | A1 | 6/2013 | Wang et al. |
| 2013/0244661 | A1 | 9/2013 | Lin et al. |
| 2014/0050188 | A1 | 2/2014 | Park |
| 2014/0106707 | A1 | 4/2014 | Bontu et al. |
| 2015/0003440 | A1 | 1/2015 | Lim et al. |
| 2015/0018037 | A1 | 1/2015 | Kawakami et al. |
| 2015/0078466 | A1 | 3/2015 | Zhou et al. |
| 2015/0173115 | A1 | 6/2015 | Van Phan et al. |
| 2015/0245192 | A1 | 8/2015 | Wu et al. |
| 2015/0319798 | A1 | 11/2015 | Morita |

FOREIGN PATENT DOCUMENTS

| | | |
|---|---|---|
| CN | 102665213 | 9/2012 |
| CN | 102792745 | 11/2012 |
| CN | 102875901 | 1/2013 |
| CN | 103428817 A | 12/2013 |
| CN | 103686676 A | 3/2014 |
| EP | 2849494 | 3/2015 |
| EP | 2878144 | 8/2017 |
| JP | WO2013183728 | * 12/2013 |
| WO | WO2013154546 | 10/2013 |
| WO | WO2013155265 | 10/2013 |
| WO | WO2013174091 | 11/2013 |
| WO | WO2013183728 | 12/2013 |
| WO | WO2014017070 | 1/2014 |
| WO | WO2014040506 | 3/2014 |

OTHER PUBLICATIONS

*3rd Generation Partnership Project; Technical Specification Group Services and System Aspects; Proximity-based services (ProSe); Stage 2* (Release 12), 3GPP TS 23.303 V12.0.0 (Feb. 2014), pp. 1-53.
*3rd Generation Partnership Project; Technical Specification Group Core Network and Terminals; Proximity-services (ProSe) User Equipment (UE) to Proximity-services (ProSe) Function Protocol aspects*; Stage 3 (Release 12), 3GPP TS 24.334 V0.1.0 (Apr. 2014), pp. 1-25.
*3rd Generation Partnership Project; Technical Specification Group Radio Access Network; Evolved Universal Terrestrial Radio Access (E-UTRA); Physical layer procedures* (Release 12), 3GPP TS 36.213 V12.1.0 (Mar. 2014), pp. 1-186.
*3rd Generation Partnership Project; Technical Specification Group Radio Access Network; Evolved Universal Terrestrial Radio Access (E-UTRA); User Equipment (UE) procedures in idle mode* (Release 11), 3GPP TS 36.304 V11.2.0 (Dec. 2012), pp. 1-33.
*3rd Generation Partnership Project; Technical Specification Group Radio Access Network; Evolved Universal Terrestrial Radio Access (E-UTRA); Radio Resource Control (RRC); Protocol specification* (Release 11), 3GPP TS 36.331 V11.2.0 (Dec. 2012), pp. 1-340.
*3rd Generation Partnership Project; Technical Specification Group Radio Access Network; Evolved Universal Terrestrial Radio Access (E-UTRA); Radio Resource Control (RRC); Protocol specification* (Release 12), 3GPP TS 36.331 V12.1.0 (Mar. 2014), pp. 1-356.
Intel Corporation, *Type 2B resource allocation for D2D discovery*, 3GPP TSG-RAN WG Meeting #85, R2-140302, Prague, Czech Republic, Feb. 10-14, 2014 (4 pp.).
International Search Report, dated Jul. 11, 2013, in International Application No. PCT/CN2013/071554 (4 pp.).
Written Opinion of the International Searching Authority, dated Jul. 11, 2013, in International Application No. PCT/CN2013/071554 (8 pp.).
International Search Report dated Feb. 27, 2015 in International Patent Application No. PCT/CN2014/077182 (4 pp.).
Extended European Search Report, dated Feb. 4, 2016, in European Application No. 13874589.8 (9 pp.).
Extended European Search Report dated Mar. 27, 2017 in corresponding European Patent Application No. 14891332.0 (9 pp.).
Office Action, dated Oct. 7, 2016, in U.S. Appl. No. 14/821,374 (18 pp.).
Final Office Action, dated Apr. 13, 2017, in U.S. Appl. No. 14/821,374 (9 pp.).
Notice of Allowance, dated Sep. 13, 2017, U.S. Appl. No. 14/821,374 (13 pp.).
Office Action, dated Oct. 18, 2017, in U.S. Appl. No. 15/346,124 (18 pp.).
Notice of Allowance, dated Mar. 5, 2018, in U.S. Appl. No. 15/346,124 (7 pp.).
Office Action, dated Jan. 10, 2018, in U.S. Appl. No. 15/840,688 (9 pp.).
U.S. Appl. No. 14/821,374, filed Aug. 7, 2015, Lin et al., Huawei Technologies Co., Ltd.
U.S. Appl. No. 15/840,688, filed Dec. 13, 2017, Lin et al., Huawei Technologies Co., Ltd.
U.S. Appl. No. 15/346,124, filed Nov. 8, 2016, Lin et al., Huawei Technologies Co., Ltd.
Office Action, dated Nov. 12, 2018, in Chinese Application No. 201480074708.X (7 pp.).
Office Action, dated Dec. 3, 2018, in U.S. Appl. No. 15/840,688 (10 pp.).

* cited by examiner

METHOD FOR RECEIVING D2D DISCOVERY INFORMATION AND APPARATUS

CROSS-REFERENCE TO RELATED APPLICATIONS

This application is a continuation of U.S. patent application Ser. No. 15/346,124, filed on Nov. 8, 2016, which is a continuation of International Application No. PCT/CN2014/077182, filed on May 9, 2014. All of the afore-mentioned patent applications are hereby incorporated by reference in their entireties.

TECHNICAL FIELD

The present disclosure relates to communications technologies, and in particular, to a method for receiving D2D discovery information and an apparatus.

BACKGROUND

Device-to-device (D2D) communication is a new technology that allows direct communication between devices. The D2D communication can improve spectral efficiency of a cellular communications system, reduce transmit power of a device, and implement short-range communication between devices.

In a whole D2D communication process, device discovery is a start and a prerequisite for performing the D2D communication. In the prior art, a communication device listens to a D2D discovery resource, to receive and process D2D discovery information sent by another D2D communication device. The discovery information includes a pilot signal and device information. When a first communication device receives D2D discovery information sent by a second communication device, time-domain correlation is performed on a pilot signal and a local pilot sequence, so as to obtain a time when a discovery signal of the second communication device arrives at the first communication device, and parse the discovery information to obtain device information of the second communication device, so that the first communication device can discover the second communication device.

However, a device that performs D2D communication consumes much power in the prior art.

SUMMARY

Embodiments of the present disclosure provide a method for receiving D2D discovery information and an apparatus.

An embodiment of the present disclosure provides a method for receiving D2D discovery information, including:

sending, by an upper layer of a radio resource control RRC layer of a D2D communication device, a first instruction to a physical layer of the D2D communication device, where the first instruction is used to instruct the physical layer to switch from a D2D sleep state to a D2D listening state; and receiving, by the physical layer of the D2D communication device, the first instruction and switching from the D2D sleep state to the D2D listening state according to the first instruction, to listen to D2D discovery information.

An embodiment of the present disclosure provides a D2D communication device, including:

an upper-layer processing module of an RRC layer, configured to send a first instruction to a physical-layer processing module, where the first instruction is used to instruct a physical layer to switch from a D2D sleep state to a D2D listening state; and the physical-layer processing module, configured to receive the first instruction and switch from the D2D sleep state to the D2D listening state according to the first instruction, to listen to the D2D discovery information.

The embodiments of the present disclosure provide a method for receiving D2D discovery information and an apparatus. An upper layer of an RRC layer of a D2D communication device sends a first instruction to a physical layer of the D2D communication device, where the first instruction is used to instruct the physical layer to switch from a D2D sleep state to a D2D listening state; and the physical layer of the D2D communication device receives the first instruction and switches from the D2D sleep state to the D2D listening state according to the first instruction, to listen to D2D discovery information, so that the D2D communication device is in the D2D listening state when D2D communication is required. This reduces power consumption of the D2D communication device and prolongs a standby time of the D2D communication device.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
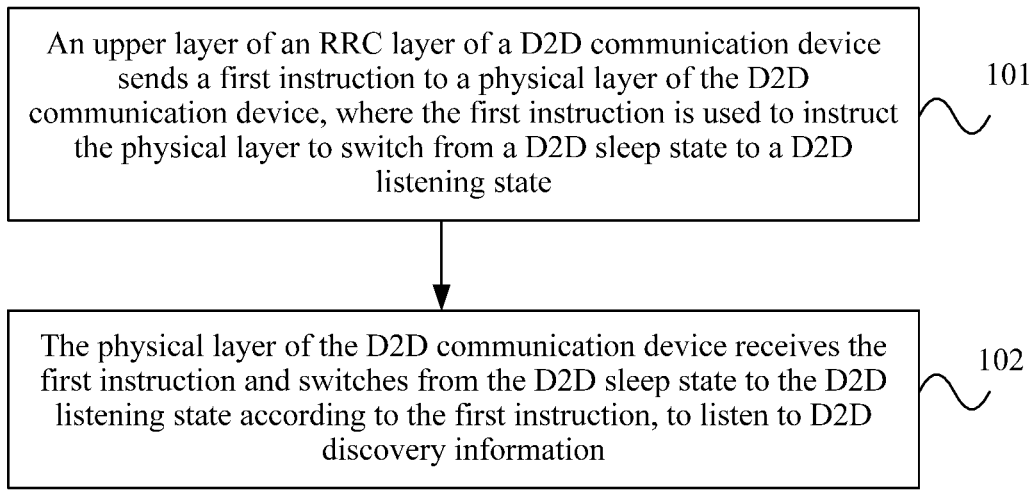
FIG. 1 is a flowchart of Embodiment 1 of a method for receiving D2D discovery information according to the present disclosure.

FIG. 1 is a flowchart of Embodiment 1 of a method for receiving D2D discovery information according to the present disclosure. As shown in FIG. 1, the method in this embodiment may include:

Operation 101: An upper layer of a radio resource control (RRC) layer of a D2D communication device sends a first instruction to a physical layer of the D2D communication device, where the first instruction is used to instruct the physical layer to switch from a D2D sleep state to a D2D listening state.

Optionally, the upper layer of the RRC layer may be an application program, an operating system, an application agent, or a non-access stratum (NAS).

Operation 102: The physical layer of the D2D communication device receives the first instruction, and switches from the D2D sleep state to the D2D listening state according to the first instruction, to listen to D2D discovery information.

Specifically, after receiving the first instruction, the physical layer of the D2D communication device switches from the D2D sleep state to the D2D listening state, to listen to D2D discovery information.

The D2D sleep state refers to that the physical layer of the D2D communication device does not listen to D2D discovery information from a physical channel. The D2D listening state refers to that the physical layer of the D2D communication device listens to D2D discovery information from a physical channel.

In the prior art, a D2D communication device listens to a D2D discovery resource, to receive and process D2D discovery information sent by another D2D communication device. In the present disclosure, the upper layer of the RRC layer of the D2D communication device sends the first instruction to the physical layer of the D2D communication device, and the physical layer of the D2D communication device receives the first instruction and switches from the D2D sleep state to the D2D listening state according to the first instruction, to listen to D2D discovery information.

In the prior art, because a D2D communication device is always in the D2D listening state, when the D2D communication device does not need to perform D2D communication, the D2D communication device still needs to receive and process discovery information sent by another D2D device. Therefore, the D2D communication device consumes much power. In the present disclosure, the upper layer of the RRC layer of the D2D communication device sends the first instruction to the physical layer of the D2D communication device, and the physical layer of the D2D communication device receives the first instruction and switches from the D2D sleep state to the D2D listening state according to the first instruction, to listen to D2D discovery information, so that the D2D communication device is in the D2D listening state when needing to perform D2D communication. This reduces power consumption of the D2D communication device and prolongs a standby time of the D2D communication device.

In this embodiment, an upper layer of an RRC layer of a D2D communication device sends a first instruction to a physical layer of the D2D communication device, and the physical layer of the D2D communication device receives the first instruction and switches from a D2D sleep state to a D2D listening state according to the first instruction, to listen to D2D discovery information, so that the D2D communication device is in the D2D listening state when D2D communication is required. This reduces power consumption of the D2D communication device and prolongs a standby time of the D2D communication device.

Embodiment 2 of the Method for Receiving D2D Discovery Information

Based on Embodiment 1 of the method for receiving D2D discovery information shown in FIG. 1, operation 101 may include: the upper layer of the RRC layer of the D2D communication device sends the first instruction to the physical layer by using the RRC layer; or the upper layer of the RRC layer of the D2D communication device sends the first instruction to the physical layer by using the RRC layer and a Media Access Control (MAC) layer; or the upper layer of the RRC layer of the D2D communication device sends the first instruction to the physical layer by using a MAC layer.

In the prior art, to reduce power consumption of a cellular communication device, a cellular communications system uses a discontinuous reception (DRX) technology, that is, the cellular communication device receives a cellular communications system message only in a predetermined time. If this technology is directly applied to the D2D communication device, there is a problem that when the D2D communication device needs to perform D2D communication, D2D discovery information is not received in time. However, in the present disclosure, the upper layer of the RRC layer of the D2D communication device sends the first instruction to the physical layer of the D2D communication device; and the physical layer switches from the D2D sleep state to the D2D listening state after receiving the first instruction, to listen to D2D discovery information, so that the D2D communication device is switched from the D2D sleep state to the D2D listening state when needing to perform D2D communication. This not only reduces power consumption of the D2D communication device and prolongs a standby time of the D2D communication device, but also implements timely receiving of D2D discovery information.

In this embodiment, an upper layer of an RRC layer of a D2D communication device sends a first instruction to a physical layer of the D2D communication device; and the physical layer switches from a D2D sleep state to a listening state after receiving the first instruction, to listen to D2D discovery information, so that the D2D communication device is switched from the D2D sleep state to the D2D listening state when needing to perform D2D communication. This not only reduces power consumption of the D2D communication device and prolongs a standby time of the D2D communication device, but also implements timely receiving of D2D discovery information.

Figure 2:
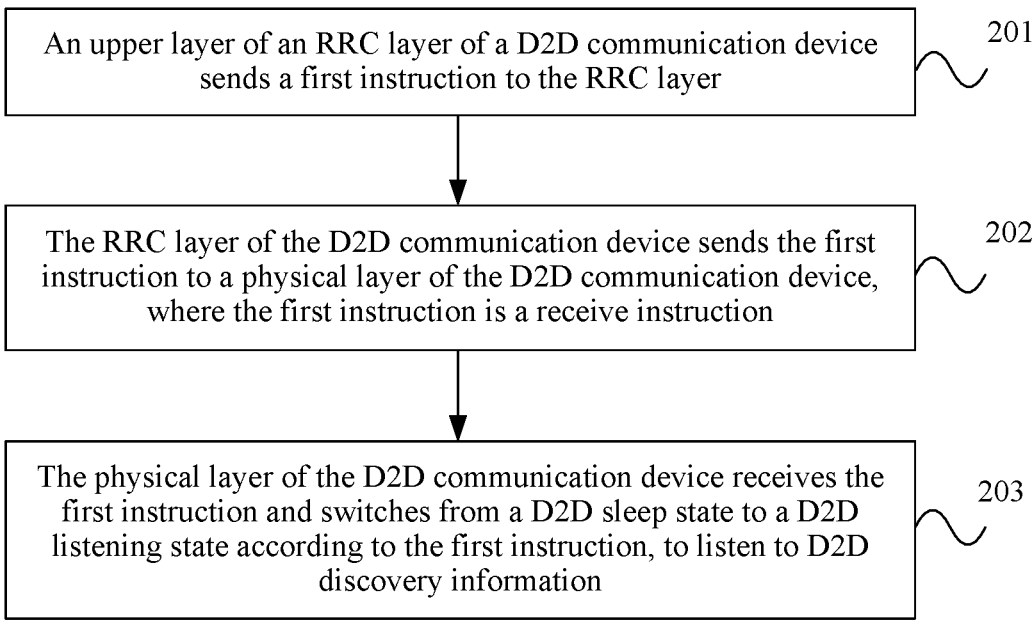
FIG. 2 is a flowchart of Embodiment 3 of a method for receiving D2D discovery information according to the present disclosure.

FIG. 2 is a flowchart of Embodiment 3 of a method for receiving D2D discovery information according to the present disclosure. As shown in FIG. 2, the method in this embodiment may include:

Operation 201: An upper layer of an RRC layer of a D2D communication device sends a first instruction to the RRC layer.

Operation 202: The RRC layer of the D2D communication device sends the first instruction to a physical layer of the D2D communication device, where the first instruction is a receiving instruction.

Operation 203: The physical layer of the D2D communication device receives the first instruction, and switches from a D2D sleep state to a D2D listening state according to the first instruction, to listen to D2D discovery information.

Specifically, the physical layer of the D2D communication device switches from the D2D sleep state to the D2D listening state after receiving the receiving instruction, to listen to D2D discovery information.

In this embodiment, an upper layer of an RRC layer of a D2D communication device sends a receiving instruction to the RRC layer; the RRC layer sends the receiving instruction to a physical layer of the D2D communication device after receiving the receiving instruction; and the physical layer switches from a D2D sleep state to a D2D listening state after receiving the receiving instruction, to listen to D2D discovery information, so that the D2D communication device is in the D2D listening state when needing to perform D2D communication. This reduces power consumption of the D2D communication device and prolongs a standby time of the D2D communication device.

Optionally, before operation 201, the method may further include: the RRC layer of the D2D communication device sends a resource instruction to the physical layer, where the resource instruction includes D2D discovery resource configuration information, and the resource instruction is used to instruct the physical layer of the D2D communication device to listen to D2D discovery information on a D2D discovery resource corresponding to the D2D discovery resource configuration information.

The D2D discovery resource configuration information may include time domain information and frequency domain information that are of the D2D discovery resource; or the D2D discovery resource configuration information may include frequency domain information of the D2D discovery resource.

Optionally, that the RRC layer of the D2D communication device sends a resource instruction to the physical layer includes: the RRC layer of the D2D communication device sends the resource instruction message to the physical layer by using a MAC layer; or the RRC layer of the D2D communication device directly sends the resource instruction message to the physical layer.

Optionally, before the upper layer of the RRC layer of the D2D communication device sends the first instruction to the physical layer of the D2D communication device, the method may further include: the RRC layer of the D2D communication device obtains the D2D discovery resource configuration information.

For example, in this embodiment, before the RRC layer of the D2D communication device sends the resource instruction message to the physical layer, the RRC layer of the D2D communication device obtains the D2D discovery resource configuration information.

Optionally, that the RRC layer of the D2D communication device obtains the D2D discovery resource configuration information includes: the RRC layer of the D2D communication device obtains the D2D discovery resource configuration information by using a system broadcast message; or the RRC layer of the D2D communication device obtains the D2D discovery resource configuration information by using a dedicated RRC message; or the RRC layer of the D2D communication device obtains the D2D discovery resource configuration information by using a protocol agreement.

Optionally, the D2D discovery resource configuration information includes a cell identity and D2D discovery resource configuration information corresponding to the cell identity.

Further, optionally, the physical layer of the D2D communication device switches from the D2D sleep state to the D2D listening state after receiving the receiving instruction, to listen to D2D discovery information on a D2D discovery resource indicated by D2D discovery resource configuration information corresponding to each cell identity in the D2D discovery resource configuration information, so that the D2D communication device not only can receive D2D discovery information sent by another D2D communication device that belongs to a same serving cell with the D2D communication device, but also can receive D2D discovery information sent by another D2D communication device from a neighbor cell.

Optionally, operation 201 includes: the upper layer of the RRC layer of the D2D communication device sends the receiving instruction and the cell identity to the RRC layer; further, the RRC layer of the D2D communication device sends the receiving instruction and the cell identity to the physical layer of the D2D communication device; further, the physical layer switches from the D2D sleep state to the D2D listening state after receiving the receiving instruction and the cell identity, to listen to D2D discovery information on the D2D discovery resource indicated by the D2D discovery resource configuration information corresponding to the cell identity, so that the D2D communication device can listen to D2D discovery information in a dedicated cell according to the instruction of the upper layer of the RRC layer.

Figure 3:
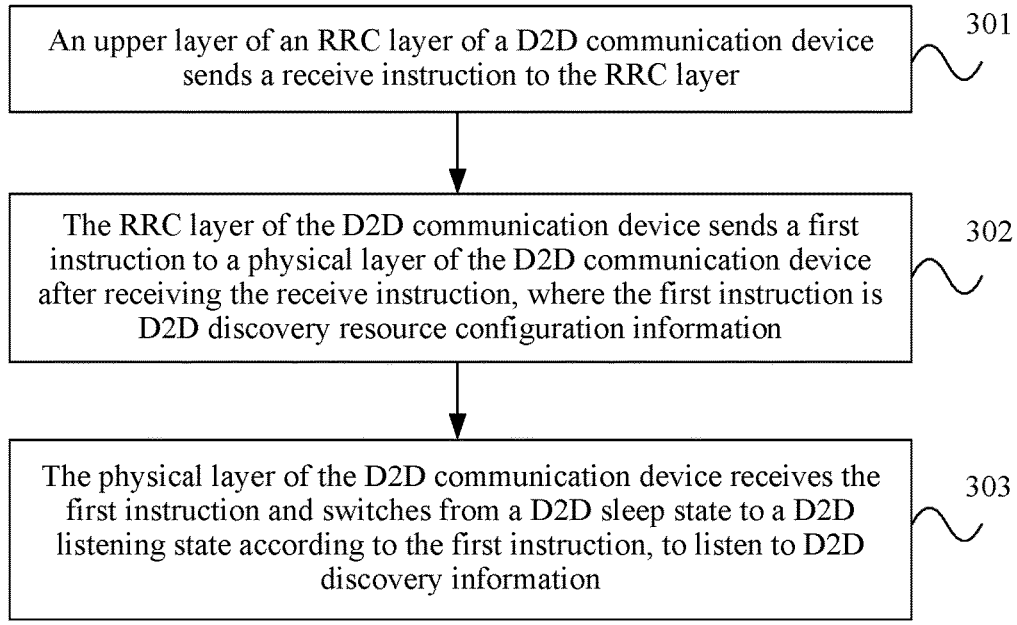
FIG. 3 is a flowchart of Embodiment 4 of a method for receiving D2D discovery information according to the present disclosure.

FIG. 3 is a flowchart of Embodiment 4 of a method for receiving D2D discovery information according to the present disclosure. As shown in FIG. 3, the method in this embodiment may include:

Operation 301: An upper layer of an RRC layer of a D2D communication device sends a receiving instruction to the RRC layer.

Operation 302: The RRC layer of the D2D communication device sends a first instruction to a physical layer of the D2D communication device after receiving the receiving instruction, where the first instruction is D2D discovery resource configuration information.

Optionally, after receiving the receiving instruction, the RRC layer of the D2D communication device replaces the receiving instruction with the D2D discovery resource configuration information as the first instruction, and sends the first instruction to the physical layer of the D2D communication device; or after receiving the receiving instruction, the RRC layer of the D2D communication device generates a new message that includes the D2D discovery resource configuration information and uses the message as the first instruction, and sends the first instruction to the physical layer of the D2D communication device.

Operation 303: The physical layer of the D2D communication device receives the first instruction, and switches from a D2D sleep state to a D2D listening state according to the first instruction, to listen to D2D discovery information.

Specifically, after the physical layer of the D2D communication device receives the D2D discovery resource configuration information, the physical layer switches from the D2D sleep state to the D2D listening state on a D2D discovery resource indicated by the D2D discovery resource configuration information, to listen to D2D discovery information.

In this embodiment, an upper layer of an RRC layer of a D2D communication device sends a receiving instruction to the RRC layer; the RRC layer sends a first instruction to a physical layer of the D2D communication device after receiving the receiving instruction, where the first instruction is D2D discovery resource configuration information; and after receiving the first instruction, the physical layer switches from a D2D sleep state to a D2D listening state on a D2D discovery resource indicated by the D2D discovery resource configuration information, to listen to D2D discovery information on the D2D discovery resource indicated by the D2D discovery resource configuration information, so that the D2D communication device is in the D2D listening state when needing to perform D2D communication. This reduces power consumption of the D2D communication device and prolongs a standby time of the D2D communication device.

Optionally, before the upper layer of the RRC layer of the D2D communication device sends the first instruction to the physical layer of the D2D communication device, the method may further include: the RRC layer of the D2D communication device obtains the D2D discovery resource configuration information.

For example, in this embodiment, before operation 301, the RRC layer of the D2D communication device obtains the D2D discovery resource configuration information; or before operation 302, the RRC layer of the D2D communication device obtains the D2D discovery resource configuration information.

A method for obtaining the D2D discovery resource configuration information by the RRC layer of the D2D communication device is the same as that in the method for receiving D2D discovery information in Embodiment 3, and details are not described herein.

Optionally, the D2D discovery resource configuration information includes a cell identity and D2D discovery resource configuration information corresponding to the cell identity.

Further, optionally, the physical layer of the D2D communication device switches from the D2D sleep state to the D2D listening state after receiving the first instruction, to listen to D2D discovery information on a D2D discovery resource indicated by D2D discovery resource configuration information corresponding to each cell identity in the D2D discovery resource configuration information, so that the D2D communication device not only can receive D2D discovery information sent by another D2D communication device that belongs to a same serving cell with the D2D communication device, but also can receive D2D discovery information sent by another D2D communication device from a neighbor cell.

Figure 4:
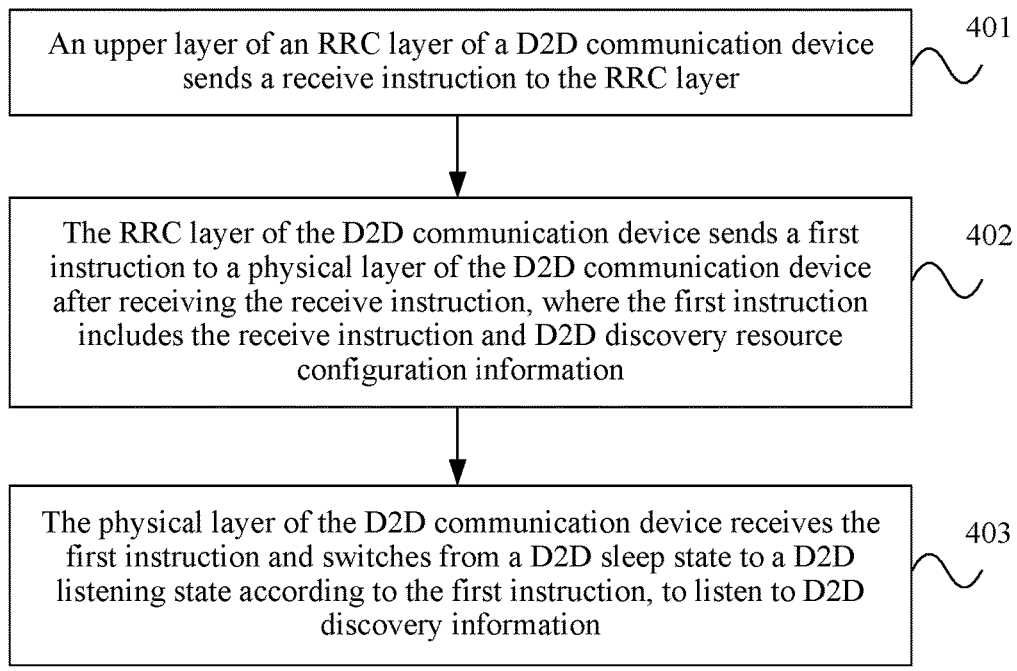
FIG. 4 is a flowchart of Embodiment 5 of a method for receiving D2D discovery information according to the present disclosure.

FIG. 4 is a flowchart of Embodiment 5 of a method for receiving D2D discovery information according to the present disclosure. As shown in FIG. 4, the method in this embodiment may include:

Operation 401: An upper layer of an RRC layer of a D2D communication device sends a receiving instruction to the RRC layer.

Operation 402: The RRC layer of the D2D communication device sends a first instruction to a physical layer of the D2D communication device after receiving the receiving instruction, where the first instruction includes the receiving instruction and D2D discovery resource configuration information.

Operation 403: The physical layer of the D2D communication device receives the first instruction, and switches from a D2D sleep state to a D2D listening state according to the first instruction, to listen to D2D discovery information.

Specifically, the physical layer of the D2D communication device receives the receiving instruction and the D2D discovery resource configuration information, and the physical layer switches from the D2D sleep state to the D2D listening state on a D2D discovery resource indicated by the D2D discovery resource configuration information, to listen to D2D discovery information.

In this embodiment, an upper layer of an RRC layer of a D2D communication device sends a receiving instruction to the RRC layer; the RRC layer sends a first instruction to a physical layer of the D2D communication device after receiving the receiving instruction, where the first instruction includes the receiving instruction and D2D discovery resource configuration information; and after receiving the first instruction, the physical layer switches from a D2D sleep state to a D2D listening state on a D2D discovery resource indicated by the D2D discovery resource configuration information, to listen to D2D discovery information on the D2D discovery resource indicated by the D2D discovery resource configuration information, so that the D2D communication device is in the D2D listening state when needing to perform D2D communication. This reduces power consumption of the D2D communication device and prolongs a standby time of the D2D communication device.

Optionally, before the upper layer of the RRC layer of the D2D communication device sends the first instruction to the physical layer of the D2D communication device, the method may further include: the RRC layer of the D2D communication device obtains the D2D discovery resource configuration information.

For example, in this embodiment, before operation 401, the RRC layer of the D2D communication device obtains the D2D discovery resource configuration information; or before operation 402, the RRC layer of the D2D communication device obtains the D2D discovery resource configuration information.

A method for obtaining the D2D discovery resource configuration information by the RRC layer of the D2D communication device is the same as that in the method for receiving D2D discovery information in Embodiment 3, and details are not described herein.

Optionally, the D2D discovery resource configuration information includes a cell identity and D2D discovery resource configuration information corresponding to the cell identity.

Further, optionally, the physical layer of the D2D communication device switches from the D2D sleep state to the D2D listening state after receiving the first instruction, to listen to D2D discovery information on a D2D discovery resource indicated by D2D discovery resource configuration information corresponding to each cell identity in the D2D discovery resource configuration information, so that the D2D communication device not only can receive D2D discovery information sent by another D2D communication device that belongs to a same serving cell, but also can receive D2D discovery information sent by another D2D communication device from a neighbor cell.

Figure 5:
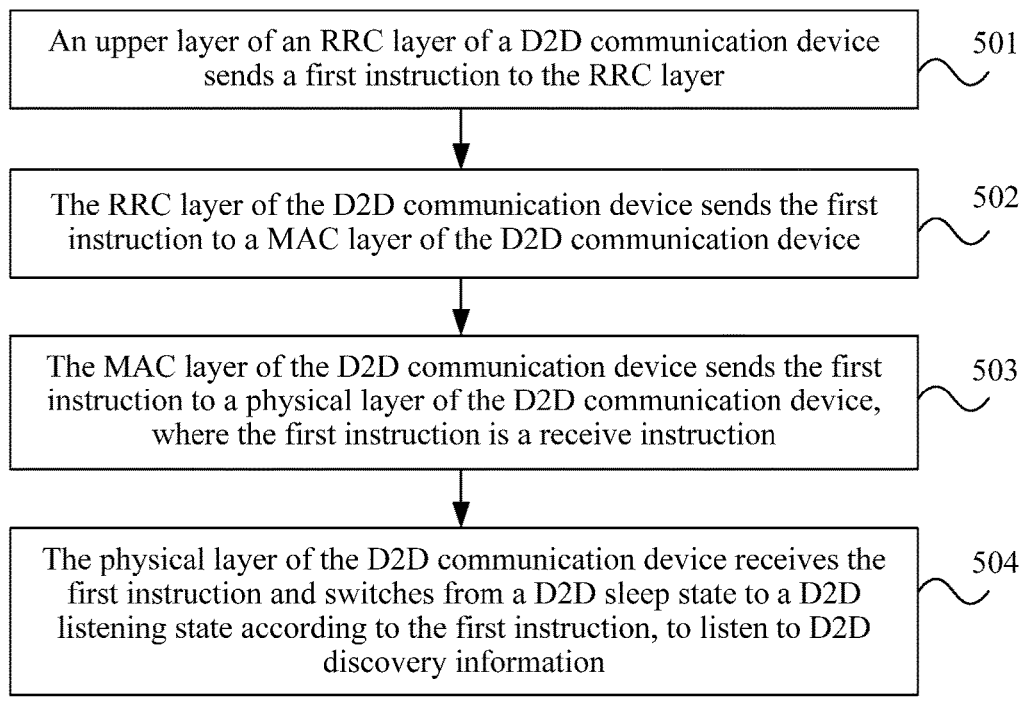
FIG. 5 is a flowchart of Embodiment 6 of a method for receiving D2D discovery information according to the present disclosure.

FIG. 5 is a flowchart of Embodiment 6 of a method for receiving D2D discovery information according to the present disclosure. As shown in FIG. 5, the method in this embodiment may include:

Operation 501: An upper layer of an RRC layer of a D2D communication device sends a first instruction to the RRC layer.

Operation 502: The RRC layer of the D2D communication device sends the first instruction to a MAC layer of the D2D communication device.

Operation 503: The MAC layer of the D2D communication device sends the first instruction to a physical layer of the D2D communication device, where the first instruction is a receiving instruction.

Operation 504: The physical layer of the D2D communication device receives the first instruction, and switches from a D2D sleep state to a D2D listening state according to the first instruction, to listen to D2D discovery information.

Specifically, the physical layer of the D2D communication device switches from the D2D sleep state to the D2D listening state after receiving the receiving instruction, to listen to D2D discovery information.

In this embodiment, an upper layer of an RRC layer of a D2D communication device sends a receiving instruction to the RRC layer; the RRC layer sends the receiving instruction to a MAC layer of the D2D communication device after receiving the receiving instruction; the MAC layer sends the receiving instruction to a physical layer of the communication device after receiving the receiving instruction; and the physical layer switches from a D2D sleep state to a D2D listening state after receiving the receiving instruction, to listen to D2D discovery information, so that the D2D communication device is in the D2D listening state when needing to perform D2D communication. This reduces power consumption of the D2D communication device and prolongs a standby time of the D2D communication device.

Optionally, before operation 501, the method may further include: the RRC layer of the D2D communication device sends a resource instruction to the physical layer, where the resource instruction includes D2D discovery resource configuration information, and the resource instruction is used to instruct the physical layer of the D2D communication device to listen to D2D discovery information on a D2D discovery resource corresponding to the D2D discovery resource configuration information.

The method for sending the resource instruction to the physical layer by the RRC layer of the D2D communication device is the same as that in the method for receiving D2D discovery information in Embodiment 3, and details are not described herein.

Optionally, before the upper layer of the RRC layer of the D2D communication device sends the first instruction to the physical layer of the D2D communication device, the method may further include: the RRC layer of the D2D communication device obtains the D2D discovery resource configuration information.

For example, in this embodiment, before the RRC layer of the D2D communication device sends the resource instruction message to the physical layer, the RRC layer of the D2D communication device obtains the D2D discovery resource configuration information.

A method for obtaining the D2D discovery resource configuration information by the RRC layer of the D2D communication device is the same as that in the method for receiving D2D discovery information in Embodiment 3, and details are not described herein.

Optionally, the D2D discovery resource configuration information includes a cell identity and D2D discovery resource configuration information corresponding to the cell identity.

Further, optionally, the physical layer of the D2D communication device switches from the D2D sleep state to the D2D listening state after receiving the receiving instruction, to listen to D2D discovery information on a D2D discovery resource indicated by D2D discovery resource configuration information corresponding to each cell identity in the D2D discovery resource configuration information, so that the D2D communication device not only can receive D2D discovery information sent by another D2D communication device that belongs to a same serving cell with the D2D communication device, but also can receive D2D discovery information sent by another D2D communication device from a neighbor cell.

Optionally, operation 501 includes: the upper layer of the RRC layer of the D2D communication device sends the receiving instruction and the cell identity to the RRC layer; further, the RRC layer of the D2D communication device sends the receiving instruction and the cell identity to the MAC layer of the D2D communication device; further, the MAC layer of the D2D communication device sends the receiving instruction and the cell identity to the physical layer of the D2D communication device; further, the physical layer switches from the D2D sleep state to the D2D listening state after receiving the receiving instruction and the cell identity, to listen to D2D discovery information on the D2D discovery resource indicated by the D2D discovery resource configuration information corresponding to the cell identity, so that the D2D communication device can listen to D2D discovery information in a dedicated cell according to the instruction of the upper layer of the RRC layer.

Figure 6:
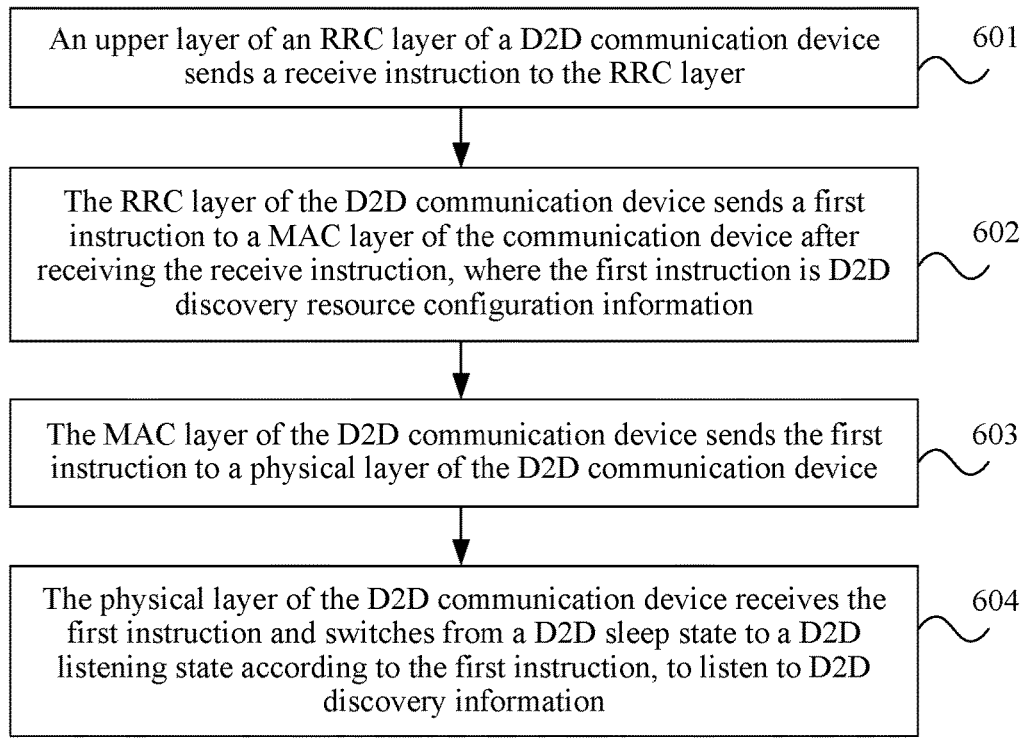
FIG. 6 is a flowchart of Embodiment 7 of a method for receiving D2D discovery information according to the present disclosure.

FIG. 6 is a flowchart of Embodiment 7 of a method for receiving D2D discovery information according to the present disclosure. As shown in FIG. 6, the method in this embodiment may include:

Operation 601: An upper layer of an RRC layer of a D2D communication device sends a receiving instruction to the RRC layer.

Operation 602: The RRC layer of the D2D communication device sends a first instruction to a MAC layer of the communication device after receiving the receiving instruction, where the first instruction is D2D discovery resource configuration information.

Optionally, after receiving the receiving instruction, the RRC layer of the D2D communication device replaces the receiving instruction with the D2D discovery resource configuration information as the first instruction, and sends the first instruction to the physical layer of the D2D communication device; or after receiving the receiving instruction, the RRC layer of the D2D communication device generates a new message that includes the D2D discovery resource configuration information and uses the message as the first instruction, and sends the first instruction to the physical layer of the D2D communication device.

Operation 603: The MAC layer of the D2D communication device sends the first instruction to a physical layer of the D2D communication device.

Operation 604: The physical layer of the D2D communication device receives the first instruction and switches from a D2D sleep state to a D2D listening state according to the first instruction, to listen to D2D discovery information.

Specifically, the physical layer of the D2D communication device receives the D2D discovery resource configuration information, and the physical layer switches from the D2D sleep state to the D2D listening state on a D2D discovery resource indicated by the D2D discovery resource configuration information, to listen to D2D discovery information.

In this embodiment, an upper layer of an RRC layer of a D2D communication device sends a receiving instruction to the RRC layer; the RRC layer sends a first instruction to a MAC layer of the D2D communication device after receiving the receiving instruction, where the first instruction is D2D discovery resource configuration information; the MAC layer sends the first instruction to a physical layer of the communication device after receiving the first instruction; and after receiving the first instruction, the physical layer switches from a D2D sleep state to a D2D listening state on a D2D discovery resource indicated by the D2D discovery resource configuration information, to listen to D2D discovery information on the D2D discovery resource indicated by the D2D discovery resource configuration information, so that the D2D communication device is in the D2D listening state when needing to perform D2D communication. This reduces power consumption of the D2D communication device and prolongs a standby time of the D2D communication device.

Optionally, before the upper layer of the RRC layer of the D2D communication device sends the first instruction to the physical layer of the D2D communication device, the method may further include: the RRC layer of the D2D communication device obtains the D2D discovery resource configuration information.

For example, in this embodiment, before operation 601, the RRC layer of the D2D communication device obtains the D2D discovery resource configuration information; or before operation 602, the RRC layer of the D2D communication device obtains the D2D discovery resource configuration information.

A method for obtaining the D2D discovery resource configuration information by the RRC layer of the D2D communication device is the same as that in the method for receiving D2D discovery information in Embodiment 3, and details are not described herein.

Optionally, the D2D discovery resource configuration information includes a cell identity and D2D discovery resource configuration information corresponding to the cell identity.

Further, optionally, the physical layer of the D2D communication device switches from the D2D sleep state to the D2D listening state after receiving the first instruction, to listen to D2D discovery information on a D2D discovery resource indicated by D2D discovery resource configuration information corresponding to each cell identity in the D2D discovery resource configuration information, so that the D2D communication device not only can receive D2D discovery information sent by another D2D communication device that belongs to a same serving cell, but also can receive D2D discovery information sent by another D2D communication device from a neighbor cell.

Figure 7:
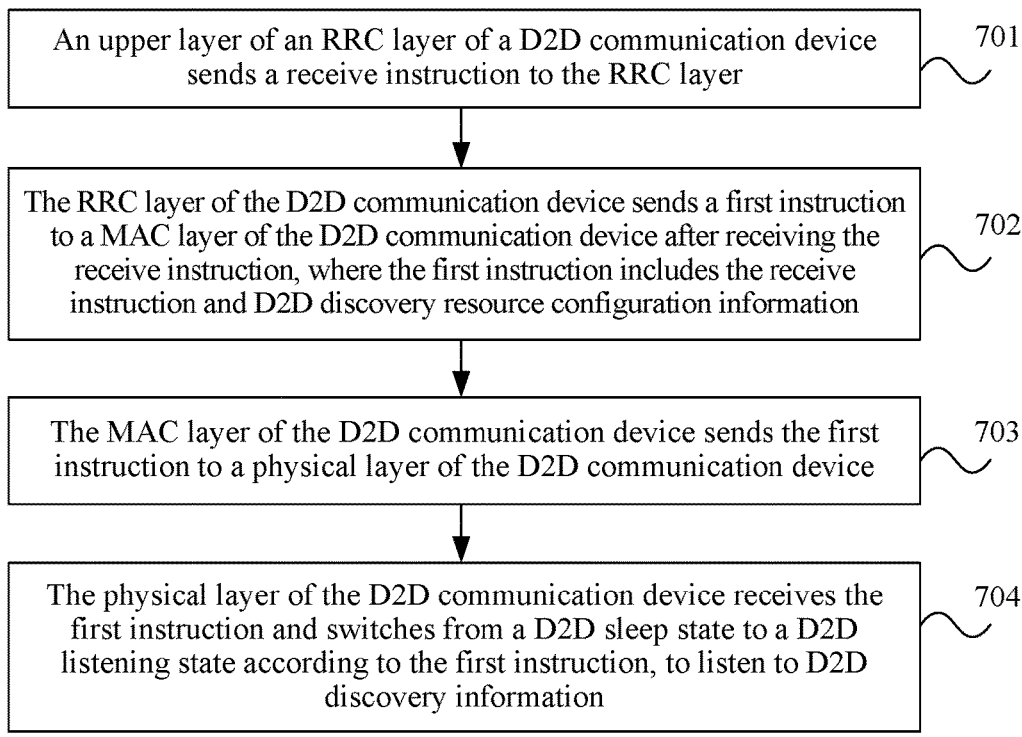
FIG. 7 is a flowchart of Embodiment 8 of a method for receiving D2D discovery information according to the present disclosure.

FIG. 7 is a flowchart of Embodiment 8 of a method for receiving D2D discovery information according to the present disclosure. As shown in FIG. 7, the method in this embodiment may include:

Operation 701: An upper layer of an RRC layer of a D2D communication device sends a receiving instruction to the RRC layer.

Operation 702: The RRC layer of the D2D communication device sends a first instruction to a MAC layer of the D2D communication device after receiving the receiving instruction, where the first instruction includes the receiving instruction and D2D discovery resource configuration information.

Operation 703: The MAC layer of the D2D communication device sends the first instruction to a physical layer of the D2D communication device.

Operation 704: The physical layer of the D2D communication device receives the first instruction, and switches from a D2D sleep state to a D2D listening state according to the first instruction, to listen to D2D discovery information.

Specifically, the physical layer of the D2D communication device receives the receiving instruction and the D2D discovery resource configuration information, and the physical layer switches from the D2D sleep state to the D2D listening state on a D2D discovery resource indicated by the D2D discovery resource configuration information, to listen to D2D discovery information.

In this embodiment, an upper layer of an RRC layer of a D2D communication device sends a receiving instruction to the RRC layer; the RRC layer sends a first instruction to a MAC layer of the D2D communication device after receiving the receiving instruction, where the first instruction includes the receiving instruction and D2D discovery resource configuration information; the MAC layer sends the first instruction to a physical layer of the D2D communication device after receiving the first instruction; and after receiving the first instruction, the physical layer switches from a D2D sleep state to a D2D listening state on a D2D discovery resource indicated by the D2D discovery resource configuration information, to listen to D2D discovery information on the D2D discovery resource indicated by the D2D discovery resource configuration information, so that the D2D communication device is in the D2D listening state when needing to perform D2D communication. This reduces power consumption of the D2D communication device and prolongs a standby time of the D2D communication device.

Optionally, before the upper layer of the RRC layer of the D2D communication device sends the first instruction to the physical layer of the D2D communication device, the method may further include: the RRC layer of the D2D communication device obtains the D2D discovery resource configuration information.

For example, in this embodiment, before operation 701, the RRC layer of the D2D communication device obtains the D2D discovery resource configuration information; or before operation 702, the RRC layer of the D2D communication device obtains the D2D discovery resource configuration information.

A method for obtaining the D2D discovery resource configuration information by the RRC layer of the D2D communication device is the same as that in the method for receiving D2D discovery information in Embodiment 3, and details are not described herein.

Optionally, the D2D discovery resource configuration information includes a cell identity and D2D discovery resource configuration information corresponding to the cell identity.

Further, optionally, the physical layer of the D2D communication device switches from the D2D sleep state to the D2D listening state after receiving the first instruction, to listen to D2D discovery information on a D2D discovery resource indicated by D2D discovery resource configuration information corresponding to each cell identity in the D2D discovery resource configuration information, so that the D2D communication device not only can receive D2D discovery information sent by another D2D communication device that belongs to a same serving cell, but also can receive D2D discovery information sent by another D2D communication device from a neighbor cell.

Figure 8:
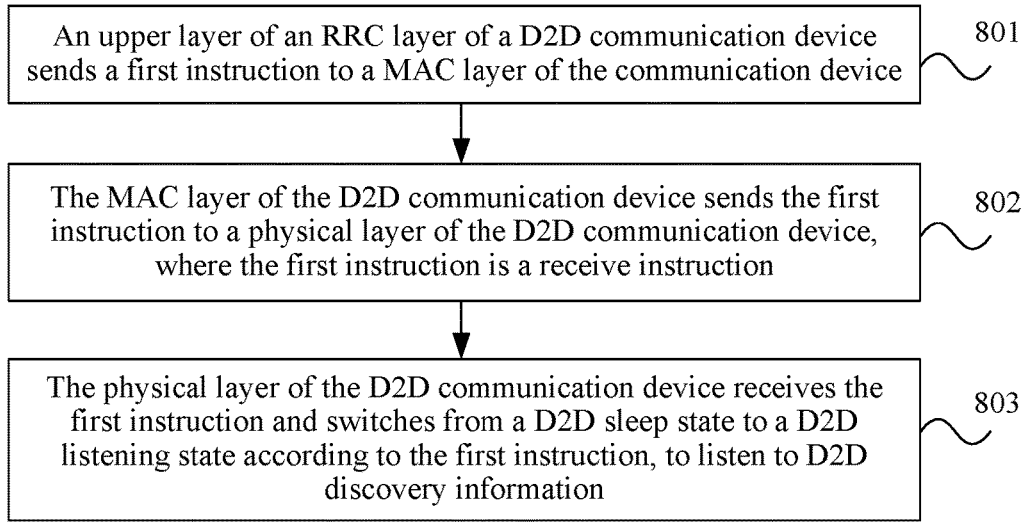
FIG. 8 is a flowchart of Embodiment 9 of a method for receiving D2D discovery information according to the present disclosure.

FIG. 8 is a flowchart of Embodiment 9 of a method for receiving D2D discovery information according to the present disclosure. As shown in FIG. 8, the method in this embodiment may include:

Operation 801: An upper layer of an RRC layer of a D2D communication device sends a first instruction to a MAC layer of the communication device.

Operation 802: The MAC layer of the D2D communication device sends the first instruction to a physical layer of the D2D communication device, where the first instruction is a receiving instruction.

Operation 803: The physical layer of the D2D communication device receives the first instruction and switches from a D2D sleep state to a D2D listening state according to the first instruction, to listen to D2D discovery information.

Specifically, the physical layer of the D2D communication device switches from the D2D sleep state to the D2D listening state after receiving the receiving instruction, to listen to D2D discovery information.

In this embodiment, an upper layer of an RRC layer of a D2D communication device sends a receiving instruction to a MAC layer of the D2D communication device; the MAC layer sends the receiving instruction to a physical layer of the D2D communication device after receiving the receiving instruction; and the physical layer switches from a D2D sleep state to a D2D listening state after receiving the receiving instruction, to listen to D2D discovery information, so that the D2D communication device is in the D2D listening state when needing to perform D2D communication. This reduces power consumption of the D2D communication device and prolongs a standby time of the D2D communication device.

Optionally, before operation 801, the method may further include: the RRC layer of the D2D communication device sends a resource instruction to the physical layer, where the resource instruction includes D2D discovery resource configuration information, and the resource instruction is used to instruct the physical layer of the D2D communication device to receive D2D discovery information on a D2D discovery resource corresponding to the D2D discovery resource configuration information.

Optionally, that the RRC layer of the D2D communication device sends a resource instruction message to the physical layer includes: the RRC layer of the D2D communication device sends the resource instruction message to the physical layer by using the MAC layer; or the RRC layer of the D2D communication device directly sends the resource instruction message to the physical layer.

The method for sending the resource instruction to the physical layer by the RRC layer of the D2D communication device is the same as that in the method for receiving D2D discovery information in Embodiment 3, and details are not described herein.

Optionally, before the upper layer of the RRC layer of the D2D communication device sends the first instruction to the physical layer of the D2D communication device, the method may further include: the RRC layer of the D2D communication device obtains the D2D discovery resource configuration information.

For example, in this embodiment, before the RRC layer of the D2D communication device sends the resource instruction message to the physical layer, the RRC layer of the D2D communication device obtains the D2D discovery resource configuration information.

A method for obtaining the D2D discovery resource configuration information by the RRC layer of the D2D communication device is the same as that in the method for receiving D2D discovery information in Embodiment 3, and details are not described herein.

Optionally, the D2D discovery resource configuration information includes a cell identity and D2D discovery resource configuration information corresponding to the cell identity.

Further, optionally, the physical layer of the D2D communication device switches from the D2D sleep state to the D2D listening state after receiving the receiving instruction, to listen to D2D discovery information on a D2D discovery resource indicated by D2D discovery resource configuration information corresponding to each cell identity in the D2D discovery resource configuration information, so that the D2D communication device not only can receive D2D discovery information sent by another D2D communication device that belongs to a same serving cell, but also can receive D2D discovery information sent by another D2D communication device from a neighbor cell.

Optionally, operation 801 includes: the upper layer of the RRC layer of the D2D communication device sends the receiving instruction and the cell identity to the MAC layer of the D2D communication device; further, the MAC layer of the D2D communication device sends the receiving instruction and the cell identity to the physical layer of the D2D communication device; further, the physical layer switches from the D2D sleep state to the D2D listening state after receiving the receiving instruction and the cell identity, to listen to D2D discovery information on the D2D discovery resource indicated by the D2D discovery resource configuration information corresponding to the cell identity, so that the D2D communication device can listen to D2D discovery information in a dedicated cell according to the instruction of the upper layer of the RRC layer.

Figure 9:
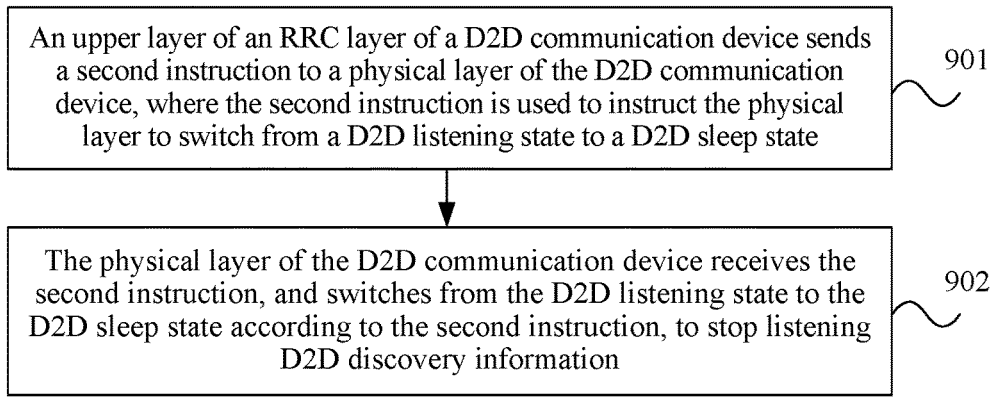
FIG. 9 is a flowchart of Embodiment 10 of a method for receiving D2D discovery information according to the present disclosure.

FIG. 9 is a flowchart of Embodiment 10 of a method for receiving D2D discovery information according to the present disclosure. As shown in FIG. 9, the method in this embodiment may include:

Operation 901: An upper layer of an RRC layer of a D2D communication device sends a second instruction to a physical layer of the D2D communication device, where the second instruction is used to instruct the physical layer to switch from a D2D listening state to a D2D sleep state.

Operation 902: The physical layer of the D2D communication device receives the second instruction, and switches from the D2D listening state to the D2D sleep state according to the second instruction, to stop listening to D2D discovery information.

In the prior art, a D2D communication device listens to a D2D discovery resource, to receive and process D2D discovery information sent by another D2D communication device. In the present disclosure, the upper layer of the RRC layer of the D2D communication device sends the second instruction to the physical layer of the D2D communication device, and the physical layer of the D2D communication device receives the second instruction and switches from the D2D listening state to the D2D sleep state according to the second instruction, to stop listening to D2D discovery information.

In the prior art, because a D2D communication device is always in the D2D listening state, when the D2D communication device does not need to perform D2D communication, the D2D communication device still needs to receive and process discovery information sent by another D2D device. Therefore, the D2D communication device consumes much power. In the present disclosure, the upper layer of the RRC layer of the D2D communication device sends the second instruction to the physical layer of the D2D communication device, and the physical layer of the D2D communication device receives the second instruction and switches from the D2D listening state to the D2D sleep state according to the second instruction, to stop listening to D2D discovery information, so that the D2D communication device is in the D2D sleep state when D2D communication does not need to be performed. This reduces power consumption of the D2D communication device and prolongs a standby time of the D2D communication device.

In the present disclosure, an upper layer of an RRC layer of a D2D communication device sends a second instruction to a physical layer of the D2D communication device, and the physical layer of the D2D communication device receives the second instruction and switches from a D2D listening state to a sleep state according to the second instruction, to stop listening to D2D discovery information, so that the D2D communication device is in the D2D sleep state when D2D communication does not need to be performed. This reduces power consumption of the D2D communication device and prolongs a standby time of the D2D communication device.

Embodiment 11 of the Method for Receiving D2D Discovery Information

Based on Embodiment 10 of the method for receiving D2D discovery information shown in FIG. 9, operation 901 may include: the upper layer of the RRC layer of the D2D communication device sends the second instruction to the physical layer by using the RRC layer; or the upper layer of the RRC layer of the D2D communication device sends the second instruction to the physical layer by using the RRC layer and a Media Access Control MAC layer; or the upper layer of the RRC layer of the D2D communication device sends the second instruction to the physical layer by using a MAC layer.

In the present disclosure, an upper layer of an RRC layer of a D2D communication device sends a second instruction to a physical layer of the D2D communication device, and the physical layer of the D2D communication device receives the second instruction and switches from a D2D listening state to a sleep state according to the second instruction, to stop listening to D2D discovery information, so that the D2D communication device is in the D2D sleep state when D2D communication does not need to be performed. This reduces power consumption of the D2D communication device and prolongs a standby time of the D2D communication device.

It should be noted that: there is no correspondence between a manner in which the upper layer of the RRC layer sends the first instruction to the physical layer in Embodiment 11 of the method for receiving D2D discovery information and a manner in which the upper layer of the RRC layer sends the second instruction to the physical layer in Embodiment 2 of the method for receiving D2D discovery information.

Optionally, the second instruction may include a stop receiving instruction.

Optionally, the second instruction may include a cell identity, so that the physical layer of the D2D communication device receives the second instruction and switches from the D2D listening state to the D2D sleep state according to the second instruction, to stop listening to D2D discovery information on a D2D discovery resource indicated by D2D discovery resource configuration information corresponding to the cell identity in the second instruction.

Figure 10:
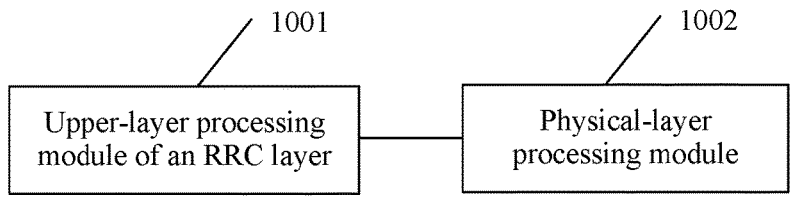
FIG. 10 is a schematic structural diagram of Embodiment 1 of a D2D communication device according to the present disclosure.

FIG. 10 is a schematic structural diagram of Embodiment 1 of a D2D communication device according to the present disclosure. As shown in FIG. 10, the D2D communication device in this embodiment may include: an upper-layer processing module 1001 of an RRC layer, configured to send a first instruction to a physical-layer processing module 1002, where the first instruction is used to instruct a physical layer to switch from a D2D sleep state to a D2D listening state; and the physical-layer processing module 1002, configured to receive the first instruction and switch from the D2D sleep state to the D2D listening state according to the first instruction, to listen to D2D discovery information.

The D2D communication device in this embodiment may be configured to execute the technical solution of the method embodiment shown in FIG. 1, and an implementation principle and a technical effect thereof are similar, which are not described in detail herein.

Embodiment 2 of the D2D Communication Device

Based on Embodiment 1 of the D2D communication device shown in FIG. 10, further, the upper-layer processing module 1001 of the RRC layer is specifically configured to send the first instruction to the physical-layer processing module by using the RRC layer; or send the first instruction to the physical-layer processing module by using the RRC layer and a Media Access Control MAC layer; or send the first instruction to the physical-layer processing module by using a MAC layer.

The D2D communication device in this embodiment may be used to execute the technical solution in method Embodiment 2, and an implementation principle and a technical effect thereof are similar, which are not described in detail herein.

Figure 11:
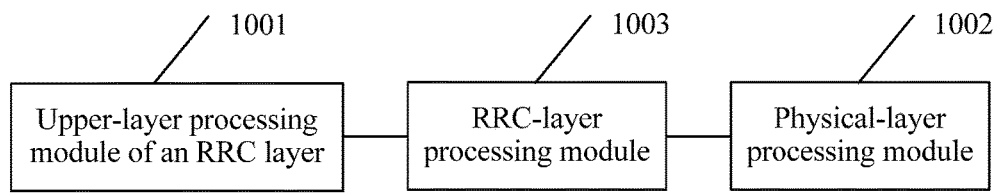
FIG. 11 is a schematic structural diagram of Embodiment 3 of a D2D communication device according to the present disclosure.

FIG. 11 is a schematic structural diagram of Embodiment 3 of a D2D communication device according to the present disclosure. As shown in FIG. 11, based on a D2D communication device structure shown in FIG. 10, the D2D communication device in this embodiment may further include: an RRC-layer processing module 1003, configured to send the first instruction to the physical-layer processing module 1002 after receiving the first instruction sent by the upper-layer processing module 1001, where the first instruction is a receiving instruction; and the upper-layer processing module 1001 of the RRC layer is specifically configured to send the first instruction to the RRC-layer processing module 1003.

Optionally, the RRC-layer processing module 1003 may be further configured to send a resource instruction to the physical-layer processing module 1002 before the upper-layer processing module 1001 of the RRC layer sends the first instruction to the physical-layer processing module 1002; and the resource instruction includes D2D discovery resource configuration information, and the resource instruction is used to instruct the physical-layer processing module 1002 to listen to D2D discovery information on a D2D discovery resource corresponding to the D2D discovery resource configuration information. Further, optionally, the RRC-layer processing module 1003 is specifically configured to send the resource instruction message to the physical-layer processing module 1002 by using a MAC layer; or send the resource instruction message to the physical-layer processing module 1002 directly.

Optionally, the RRC-layer processing module 1003 may be further configured to obtain the D2D discovery resource configuration information before the upper-layer processing module 1001 of the RRC layer sends the first instruction to the physical-layer processing module 1002. Further, optionally, the RRC-layer processing module 1003 is specifically configured to obtain the D2D discovery resource configuration information by using a system broadcast message; or obtain the D2D discovery resource configuration information by using a dedicated RRC message; or obtain the D2D discovery resource configuration information by using a protocol agreement.

The D2D communication device in this embodiment may be configured to execute the technical solution of the method embodiment shown in FIG. 2, and an implementation principle and a technical effect thereof are similar, which are not described in detail herein.

Embodiment 4 of the D2D Communication Device

As shown in FIG. 11, based on a D2D communication device structure shown in FIG. 10, the D2D communication device in this embodiment may further include: an RRC-layer processing module 1003, configured to send the first instruction to the physical-layer processing module 1002 after receiving a receiving instruction sent by the upper-layer processing module 1001, where the first instruction is D2D discovery resource configuration information; and the upper-layer processing module 1001 of the RRC layer is specifically configured to send the receiving instruction to the RRC-layer processing module 1003.

Optionally, the RRC-layer processing module 1003 may be further configured to obtain the D2D discovery resource configuration information before the upper-layer processing module 1001 of the RRC layer sends the first instruction to the physical-layer processing module 1002. Further, optionally, the RRC-layer processing module 1003 is specifically configured to: obtain the D2D discovery resource configuration information by using a system broadcast message; or obtain the D2D discovery resource configuration information by using a dedicated RRC message; or obtain the D2D discovery resource configuration information by using a protocol agreement.

The D2D communication device in this embodiment may be configured to execute the technical solution of the method embodiment shown in FIG. 3, and an implementation principle and a technical effect thereof are similar, which are not described in detail herein.

Embodiment 5 of the D2D Communication Device

As shown in FIG. 11, based on a D2D communication device structure shown in FIG. 10, the D2D communication device in this embodiment may further include: an RRC-layer processing module 1003, configured to send the first instruction to the physical-layer processing module 1002 after receiving a receiving instruction sent by the upper-layer processing module 1001 of the RRC layer, where the first instruction includes the receiving instruction and D2D discovery resource configuration information; and the upper-layer processing module 1001 of the RRC layer is specifically configured to send the receiving instruction to the RRC-layer processing module 1003.

Optionally, the RRC-layer processing module 1003 may be further configured to obtain the D2D discovery resource configuration information before the upper-layer processing module 1001 of the RRC layer sends the first instruction to the physical-layer processing module 1002. Further, optionally, the RRC-layer processing module 1003 is specifically configured to obtain the D2D discovery resource configuration information by using a system broadcast message; or obtain the D2D discovery resource configuration information by using a dedicated RRC message; or obtain the D2D discovery resource configuration information by using a protocol agreement.

The D2D communication device in this embodiment may be configured to execute the technical solution of the method embodiment shown in FIG. 4, and an implementation principle and a technical effect thereof are similar, which are not described in detail herein.

Figure 12:
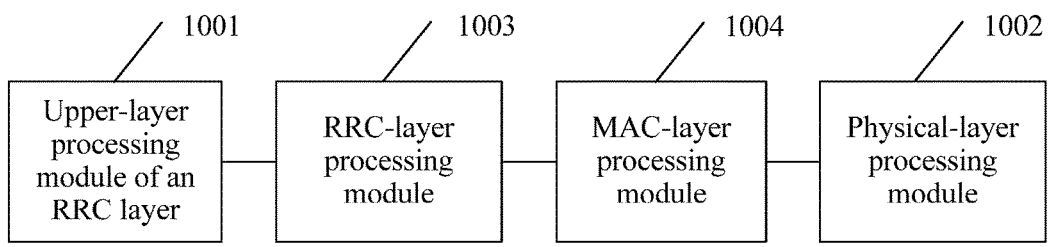
FIG. 12 is a schematic structural diagram of Embodiment 6 of a D2D communication device according to the present disclosure.

FIG. 12 is a schematic structural diagram of Embodiment 6 of a D2D communication device according to the present disclosure. As shown in FIG. 12, based on a D2D communication device structure shown in FIG. 10, the D2D communication device in this embodiment may further include: an RRC-layer processing module 1003, configured to send the first instruction to a MAC-layer processing module 1004 after receiving the first instruction sent by the upper-layer processing module 1001 of the RRC layer; and the MAC-layer processing module 1004, configured to receive the first instruction and send the first instruction to the physical-layer processing module 1002, where the first instruction is a receiving instruction; and the upper-layer processing module 1001 of the RRC layer is specifically configured to send the first instruction to the RRC-layer processing module 1003.

Optionally, the RRC-layer processing module 1003 may be further configured to send a resource instruction to the physical-layer processing module 1002 before the upper-layer processing module 1001 of the RRC layer sends the first instruction to the physical-layer processing module 1002; and the resource instruction includes D2D discovery resource configuration information, and the resource instruction is used to instruct the physical-layer processing module 1002 to listen to D2D discovery information on a D2D discovery resource corresponding to the D2D discovery resource configuration information. Further, optionally, the RRC-layer processing module 1003 is specifically configured to send the resource instruction message to the physical-layer processing module 1002 by using a MAC layer; or send the resource instruction message to the physical-layer processing module 1002 directly.

Optionally, the RRC-layer processing module 1003 may be further configured to obtain the D2D discovery resource configuration information before the upper-layer processing module 1001 of the RRC layer sends the first instruction to the physical-layer processing module 1002. Further, optionally, the RRC-layer processing module 1003 is specifically configured to obtain the D2D discovery resource configuration information by using a system broadcast message; or obtain the D2D discovery resource configuration information by using a dedicated RRC message; or obtain the D2D discovery resource configuration information by using a protocol agreement.

The D2D communication device in this embodiment may be configured to execute the technical solution of the method embodiment shown in FIG. 5, and an implementation principle and a technical effect thereof are similar, which are not described in detail herein.

Embodiment 7 of the D2D Communication Device

As shown in FIG. 12, based on a D2D communication device structure shown in FIG. 10, the D2D communication device in this embodiment may further include: an RRC-layer processing module 1003, configured to send the first instruction to a MAC-layer processing module 1004 after receiving a receiving instruction sent by the upper-layer processing module 1001 of the RRC layer, where the first instruction is D2D discovery resource configuration information; and the MAC-layer processing module 1004, configured to receive the first instruction and send the first instruction to the physical-layer processing module 1002; and the upper-layer processing module 1001 of the RRC layer is specifically configured to send the receiving instruction to the RRC-layer processing module 1003.

Optionally, the RRC-layer processing module 1003 may be further configured to obtain the D2D discovery resource configuration information before the upper-layer processing module 1001 of the RRC layer sends the first instruction to the physical-layer processing module 1002. Further, optionally, the RRC-layer processing module 1003 is specifically configured to obtain the D2D discovery resource configuration information by using a system broadcast message; or obtain the D2D discovery resource configuration information by using a dedicated RRC message; or obtain the D2D discovery resource configuration information by using a protocol agreement.

The D2D communication device in this embodiment may be configured to execute the technical solution of the method embodiment shown in FIG. 6, and an implementation principle and a technical effect thereof are similar, which are not described in detail herein.

Embodiment 8 of the D2D Communication Device

As shown in FIG. 12, based on a D2D communication device structure shown in FIG. 10, the D2D communication device in this embodiment may further include: an RRC-layer processing module 1003, configured to send the first instruction to a MAC-layer processing module 1004 after receiving a receiving instruction sent by the upper-layer processing module 1001 of the RRC layer, where the first instruction includes the receiving instruction and D2D discovery resource configuration information; and the MAC-layer processing module 1004, configured to send the first instruction to the physical-layer processing module 1002 after receiving the first instruction; and the upper-layer processing module 1001 of the RRC layer is specifically configured to send the receiving instruction to the RRC-layer processing module 1003.

Optionally, the RRC-layer processing module 1003 may be further configured to obtain the D2D discovery resource configuration information before the upper-layer processing module 1001 of the RRC layer sends the first instruction to the physical-layer processing module 1002. Further, optionally, the RRC-layer processing module 1003 is specifically configured to obtain the D2D discovery resource configuration information by using a system broadcast message; or obtain the D2D discovery resource configuration information by using a dedicated RRC message; or obtain the D2D discovery resource configuration information by using a protocol agreement.

The D2D communication device in this embodiment may be configured to execute the technical solution of the method embodiment shown in FIG. 7, and an implementation principle and a technical effect thereof are similar, which are not described in detail herein.

Embodiment 9 of the D2D Communication Device

As shown in FIG. 12, based on a D2D communication device structure shown in FIG. 10, the D2D communication device in this embodiment may further include: a MAC-layer processing module 1004, configured to send the first instruction to the physical-layer processing module 1002 after receiving the first instruction sent by the upper-layer processing module 1001 of the RRC layer, where the first instruction is a receiving instruction; the upper-layer processing module 1001 of the RRC layer is specifically configured to send the first instruction to the MAC-layer processing module 1004; and the physical-layer processing module 1002 is specifically configured to receive the first instruction and switch from a D2D sleep state to a D2D listening state according to the receiving instruction, to listen to D2D discovery information.

Optionally, the D2D communication device in this embodiment may further include: an RRC-layer processing module 1003, configured to send a resource instruction to the physical-layer processing module 1002 before the upper-layer processing module 1001 of the RRC layer sends the first instruction to the physical-layer processing module 1002.

The resource instruction includes D2D discovery resource configuration information, and the resource instruction is used to instruct the physical-layer processing module 1002 to listen to D2D discovery information on a D2D discovery resource corresponding to the D2D discovery resource configuration information.

Further, optionally, the RRC-layer processing module 1003 is specifically configured to send the resource instruction message to the physical-layer processing module 1002 by using a MAC layer; or send the resource instruction message to the physical-layer processing module 1002 directly.

Optionally, the RRC-layer processing module 1003 may be further configured to obtain the D2D discovery resource configuration information before the upper-layer processing module 1001 of the RRC layer sends the first instruction to the physical-layer processing module 1002.

Further, optionally, the RRC-layer processing module 1003 is specifically configured to obtain the D2D discovery resource configuration information by using a system broadcast message; or obtain the D2D discovery resource configuration information by using a dedicated RRC message; or obtain the D2D discovery resource configuration information by using a protocol agreement.

The D2D communication device in this embodiment may be configured to execute the technical solution of the method embodiment shown in FIG. 8, and an implementation principle and a technical effect thereof are similar, which are not described in detail herein.

Embodiment 10 of the D2D Communication Device

Based on the foregoing Embodiments 1 to 9 of the communication device D2D, in this embodiment, further, the upper-layer processing module 1001 of the RRC layer is further configured to send a second instruction to the physical-layer processing module 1002, where the second instruction is used to instruct a physical layer to switch from a D2D listening state to a D2D sleep state; and the physical-layer processing module 1002 is further configured to receive the second instruction and switch from the D2D listening state to the D2D sleep state according to the second instruction, to stop listening to D2D discovery information.

The D2D communication device in this embodiment may be configured to execute the technical solution of the method embodiment shown in FIG. 9, and an implementation principle and a technical effect thereof are similar, which are not described in detail herein.

Embodiment 11 of the D2D Communication Device

Based on Embodiment 10 of the D2D communication device shown in FIG. 10, further, the upper-layer processing module 1001 of the RRC layer is specifically configured to send a second instruction to the physical-layer processing module by using the RRC layer; or send a second instruction to the physical-layer processing module by using the RRC layer and a MAC layer; or send a second instruction to the physical-layer processing module by using a MAC layer.

The D2D communication device in this embodiment may be used to execute the technical solution in method Embodiment 11, and an implementation principle and a technical effect thereof are similar, which are not described in detail herein.

A person of ordinary skill in the art may understand that all or some of the operations of the method embodiments may be implemented by a program instructing relevant hardware. The program may be stored in a computer readable storage medium. When the program runs, the operations of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for receiving device to device (D2D) discovery information, comprising:
    obtaining, by a radio resource control, RRC, layer of a D2D communication device, D2D discovery resource configuration information by using a system broadcast message;
    sending, by the RRC layer of the D2D communication device, a resource instruction to a physical layer of the D2D communication device, wherein the resource instruction includes the D2D discovery resource configuration information, and the resource instruction is used to instruct the physical layer of the D2D communication device to listen to the D2D discovery information on a D2D discovery resource corresponding to the D2D discovery resource configuration information;
    sending, by an upper layer of the RRC layer of the D2D communication device, a first instruction to the RRC layer;
    sending, by the RRC layer of the D2D communication device, the first instruction to the physical layer of the D2D communication device, where the first instruction is a receiving instruction; and
    receiving, by the physical layer of the D2D communication device, the first instruction, and switching from a D2D sleep state to a D2D listening state according to the first instruction, to listen to the D2D discovery information.

2. The method according to claim 1, wherein:
    the D2D discovery resource configuration information includes a cell identity and D2D discovery resource configuration information corresponding to the cell identity.

3. A device to device (D2D) communication device comprising:
    a memory to store instructions; and
    at least one processor to execute the instructions to cause the D2D communication device to implement:
        a radio resource control (RRC) layer processing module configured to obtain D2D discovery resource configuration information by using a system broadcast message and configured to send a resource instruction to a physical layer processing module of the D2D communication device, wherein the resource instruction includes the D2D discovery resource configuration information, and the resource instruction is used to instruct the physical layer processing module of the D2D communication device to listen to D2D discovery information on a D2D discovery resource corresponding to the D2D discovery resource configuration information; and
        an upper layer processing module of the RRC layer processing module configured to send a first instruction to the RRC layer processing module,
    wherein the RRC layer processing module is further configured to send the first instruction to the physical layer processing module, where the first instruction is a receiving instruction; and
    wherein the physical layer processing module is further configured to receive the first instruction, and is further configured to switch from a D2D sleep state to a D2D listening state according to the first instruction, to listen to the D2D discovery information.

4. The device according to claim 3, wherein:
    the D2D discovery resource configuration information includes a cell identity and D2D discovery resource configuration information corresponding to the cell identity.

5. A non-transitory computer readable storage medium storing a program that, when executed by a computer, causes the computer to execute a method for receiving device to device (D2D) discovery information, comprising:
    obtaining, by a radio resource control, RRC, layer of a D2D communication device, D2D discovery resource configuration information by using a system broadcast message;
    sending, by the RRC layer of the D2D communication device, a resource instruction to a physical layer of the D2D communication device, wherein the resource instruction includes the D2D discovery resource configuration information, and the resource instruction is used to instruct the physical layer of the D2D communication device to listen to the D2D discovery information on a D2D discovery resource corresponding to the D2D discovery resource configuration information;
    sending, by an upper layer of the RRC layer of the D2D communication device, a first instruction to the RRC layer;
    sending, by the RRC layer of the D2D communication device, the first instruction to the physical layer of the D2D communication device, where the first instruction is a receiving instruction; and
    receiving, by the physical layer of the D2D communication device, the first instruction, and switching from a D2D sleep state to a D2D listening state according to the first instruction, to listen to the D2D discovery information.

6. The non-transitory computer readable storage medium according to claim 5, wherein:
the D2D discovery resource configuration information includes a cell identity and D2D discovery resource configuration information corresponding to the cell identity.

* * * * *

UNITED STATES PATENT AND TRADEMARK OFFICE
CERTIFICATE OF CORRECTION

PATENT NO. : 10,244,471 B2
APPLICATION NO. : 15/997208
DATED : March 26, 2019
INVENTOR(S) : Bo Lin et al.

Page 1 of 1

It is certified that error appears in the above-identified patent and that said Letters Patent is hereby corrected as shown below:

On the Title Page

On Page 2, item (56), Line 45:
In Foreign Patent Documents, delete "102875901" and insert --102857901--, therefor.

Signed and Sealed this
Thirty-first Day of December, 2019

Andrei Iancu
*Director of the United States Patent and Trademark Office*